United States Patent
Wang et al.

(10) Patent No.: US 10,884,639 B2
(45) Date of Patent: Jan. 5, 2021

(54) PROVIDING SINGLE DATA RATE (SDR) MODE OR DOUBLE DATA RATE (DDR) MODE FOR THE COMMAND AND ADDRESS (CA) BUS OF REGISTERING CLOCK DRIVE (RCD) FOR DYNAMIC RANDOM ACCESS MEMORY (DRAM)

(71) Applicant: QUALCOMM Incorporated, San Diego, CA (US)

(72) Inventors: Liyong Wang, Cary, NC (US); Kuljit Singh Bains, Olympia, WA (US); Wesley Queen, Raleigh, NC (US)

(73) Assignee: Qualcomm Incorporated, San Diego, CA (US)

( * ) Notice: Subject to any disclaimer, the term of this patent is extended or adjusted under 35 U.S.C. 154(b) by 88 days.

(21) Appl. No.: 15/901,693

(22) Filed: Feb. 21, 2018

(65) Prior Publication Data

US 2018/0246665 A1    Aug. 30, 2018

Related U.S. Application Data (60) Provisional application No. 62/463,896, filed on Feb. 27, 2017.

(51) Int. Cl.
*G06F 3/06* (2006.01)
*G06F 13/16* (2006.01)

(52) U.S. Cl.
CPC .......... *G06F 3/0634* (2013.01); *G06F 3/0604* (2013.01); *G06F 3/0659* (2013.01); *G06F 3/0673* (2013.01); *G06F 13/1678* (2013.01)

(58) Field of Classification Search
None
See application file for complete search history.

(56) References Cited

U.S. PATENT DOCUMENTS

2004/0133758 A1* 7/2004 Matsuda ............. G06F 13/1694
711/167
2004/0240275 A1* 12/2004 Koo ...................... G11C 7/1045
365/189.05

(Continued)

FOREIGN PATENT DOCUMENTS

WO    2017023508 A1    2/2017

OTHER PUBLICATIONS

International Search Report and Written Opinion—PCT/US2018/019251—ISA/EPO—dated May 4, 2018.

*Primary Examiner* — Tracy C. Chan
(74) *Attorney, Agent, or Firm* — Loza & Loza LLP (57) ABSTRACT

Aspects of the disclosure are directed to providing a single data rate (SDR) mode or a double data rate (DDR) mode to a Registering Clock Drive (RCD) for a memory. Accordingly, the apparatus and method may include determining data rate mode selection criteria; selecting a data rate mode based on the data rate mode selection criteria; configuring a host interface for the data rate mode; and configuring an RCD input interface for the data rate mode. In one aspect, the apparatus and method further include activating a clock signal on the host interface and on the RCD input interface; transferring data from the host interface to the RCD input interface using the clock signal; and transferring the data from an RCD output interface using the clock signal in either 1N mode or 2N mode. And, the data rate mode is one of the SDR mode or the DDR mode.

30 Claims, 6 Drawing Sheets

(56) References Cited

U.S. PATENT DOCUMENTS

| | | | |
|---|---|---|---|
| 2005/0041450 A1* | 2/2005 | Duh | G06F 5/06 365/1 |
| 2008/0056014 A1 | 3/2008 | Rajan et al. | |
| 2008/0141059 A1* | 6/2008 | Kim | G11C 7/10 713/400 |
| 2011/0128977 A1* | 6/2011 | Suzuki | G06F 13/4239 370/498 |
| 2017/0287538 A1* | 10/2017 | Gonzalez | G11C 7/222 |
| 2018/0225235 A1* | 8/2018 | Lee | G06F 11/1044 |

\* cited by examiner

PROVIDING SINGLE DATA RATE (SDR) MODE OR DOUBLE DATA RATE (DDR) MODE FOR THE COMMAND AND ADDRESS (CA) BUS OF REGISTERING CLOCK DRIVE (RCD) FOR DYNAMIC RANDOM ACCESS MEMORY (DRAM)

CROSS-REFERENCE TO RELATED APPLICATIONS

The present Application for Patent claims priority to U.S. Provisional Application No. 62/463,896, titled "PROVIDING SINGLE DATA RATE (SDR) MODE AND DOUBLE DATA RATE (DDR) MODE FOR THE COMMAND AND ADDRESS (CA) BUS OF REGISTERING CLOCK DRIVE (RCD) FOR DYNAMIC RANDOM ACCESS MEMORY (DRAM)" filed Feb. 27, 2017, and assigned to the assignee hereof and hereby expressly incorporated by reference herein as if fully set forth below and for all applicable purposes.

TECHNICAL FIELD

This disclosure relates generally to the field of command and address (CA) bus of memory devices, and, in particular, to providing single data rate (SDR) mode or double data rate (DDR) mode for the command and address (CA) bus of a registering clock drive (RCD) for a dynamic random access memory (DRAM).

BACKGROUND

Dynamic Random Access Memory (DRAM) technology may utilize Dual Data Rate (DDR) mode on the addressing mechanism, e.g., command/address (CA) input bus of the Registering Clock Drive (RCD) from a host and Single Data Rate (SDR) mode on the CA output bus of the RCD to the DRAM device. In one example, the CA input bus may be routed on a lengthy signal path from the host to the RCD input. However, due to the path length, path noise, path attenuation, and path reflection (e.g., impedance mismatch), the signal integrity of the CA input bus may be severely compromised, especially as the clock rate increases.

For example, signal integrity degradations may limit clock frequency scaling (i.e., running the clock frequency at a higher rate) to improve overall processing system performance. In addition, signal integrity degradations may result in sub-optimal signal calibration during DRAM initialization. Also, signal integrity degradation may worsen as multiple memory devices (e.g., DRAMs) are installed with a common CA bus, which may increase bus loading and lead to further signal integrity degradation. Thus, there is a need for improved storage element architectures which preserve signal integrity requirements for a memory control path (e.g., CA bus) as the clock frequency increases.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides mode selection. Accordingly, a method for providing a single data rate (SDR) mode or a double data rate (DDR) mode to a Registering Clock Drive (RCD) for a memory, including determining one or more data rate mode selection criteria; selecting a data rate mode based on the one or more data rate mode selection criteria; configuring a host interface for the data rate mode; and configuring an RCD input interface of the Registering Clock Drive (RCD) for the data rate mode.

In one example, the data rate mode is one of the SDR mode or the DDR mode. In one example, the host interface is an output of a host for connection to the Registering Clock Drive (RCD) via an input bus. In one example, the RCD input interface is an input of the Registering Clock Drive (RCD) for connection to the host via the input bus. In one example, the data rate mode is set at initialization and remains static throughout a session. In one example, the data rate mode is variable between the SDR mode and the DDR mode throughout a session.

In one example, the method further includes transferring data between the host interface and the RCD input interface using a clock signal. In one example, the transferring data includes a WRITE operation. In one example, the transferring data includes a READ operation. In one example, the data includes a command or an address.

In one example, the method further includes transferring the data from an RCD output interface using the clock signal in either 1N mode or 2N mode. In one example, the RCD output interface is an output of the RCD to the memory via an output bus. In one example, the memory is a dynamic random access memory (DRAM).

In one example, the method further includes activating the clock signal on the host interface and on the RCD input interface. In one example, the method further includes configuring the host interface to initiate a data transfer on the host interface using a clock signal. In one example, the method further includes configuring the RCD input interface to initiate a data reception on the RCD input interface using the clock signal. In one example, the one or more data rate mode selection criteria include at least one of a clock speed, a burst length, an access statistic, a read/write ratio, a latency, a duty factor, a page clustering, a streaming characteristic, a dc power constraint, or a data traffic characteristic quantified using an address correlation metric.

Another aspect of the disclosure provides an apparatus for providing a single data rate (SDR) mode or a double data rate (DDR) mode to a Registering Clock Drive (RCD) for a memory, the apparatus including a memory controller, wherein the memory controller determines one or more data rate mode selection criteria, selects a data rate mode based on the one or more data rate mode selection criteria, configures a host interface for the data rate mode and configures an RCD input interface for the data rate mode; a clock generator coupled to the memory controller, wherein the clock generator activates a clock signal on the host interface and on the RCD input interface; and a host coupled to the memory controller, wherein the host transfers data between the host interface and the RCD input interface using the clock signal.

In one example, the apparatus further includes a Registering Clock Drive (RCD) coupled to the memory controller, wherein the RCD transfers the data from an RCD output interface using the clock signal in either 1N mode or 2N mode. In one example, the host includes the host interface and the Registering Clock Drive (RCD) includes the RCD input interface and the RCD output interface. In one example, the data rate mode is one of the SDR mode or the DDR mode. In one example, the data rate mode is set at initialization and remains static throughout a session. In one example, the data rate mode is variable between the SDR mode and the DDR mode throughout a session.

Another aspect of the disclosure provides an apparatus for providing a single data rate (SDR) mode or a double data rate (DDR) mode to a Registering Clock Drive (RCD) for a memory, including means for determining one or more data rate mode selection criteria; means for selecting a data rate mode based on the one or more data rate mode selection criteria; means for configuring a host interface for the data rate mode; and means for configuring an RCD input interface of the Registering Clock Drive (RCD) for the data rate mode.

In one example, the apparatus further includes means for activating a clock signal on the host interface and on the RCD input interface; and means for transferring data from the host interface to the RCD input interface using the clock signal. In one example, the apparatus further includes means for transferring the data from an RCD output interface using the clock signal in either 1N mode or 2N mode. In one example, the data rate mode is one of the SDR mode or the DDR mode.

Another aspect of the disclosure provides a computer-readable medium storing computer executable code, operable on a device including at least one processor and at least one memory coupled to the at least one processor, wherein the at least one processor is configured to provide a single data rate (SDR) mode or a double data rate (DDR) mode to a Registering Clock Drive (RCD) for a memory, the computer executable code including: instructions for causing a computer to determine one or more data rate mode selection criteria; instructions for causing the computer to select a data rate mode based on the one or more data rate mode selection criteria; instructions for causing the computer to configure a host interface for the data rate mode; and instructions for causing the computer to configure an RCD input interface of the Registering Clock Drive (RCD) for the data rate mode.

In one example, the computer-readable medium further includes instructions for causing the computer to activate a clock signal on the host interface and on the RCD input interface; instructions for causing the computer to transfer data from the host interface to the RCD input interface using the clock signal, and wherein the data rate mode is one of the SDR mode or the DDR mode; and instructions for causing the computer to transfer the data from an RCD output interface using the clock signal in either 1N mode or 2N mode.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

A dynamic random access memory (DRAM) device is commonly used as a storage element in processing systems, such as personal computers (PCs), laptop computers, mobile devices, personal digital assistants (PDAs), etc. A DRAM may include a plurality of memory cells, where each memory cell may include a transistor and a capacitor to store a single bit of information. A DRAM may be used for at least two types of data transfer operations, a WRITE operation and a READ operation. A DRAM may store a plurality of bits into memory, a WRITE operation, using WRITE data lines to transfer bits from a data source to the DRAM data input ports for data storage into memory. Also, a DRAM may retrieve a plurality of bits from memory, a READ operation, using READ data lines to transfer bits from the DRAM data output ports to a data destination for data retrieval from memory. The WRITE and READ operations may be controlled via a separate control path, for example, a command/address (CA) bus. Commands are a set of bit patterns which designate a desired operation or state, for example, WRITE, READ, CLEAR, RESET, etc. An address is a specific group of bit patterns which designates a desired memory location for either a WRITE operation or a READ operation. Note that the quantity of bits in an address bit pattern does not necessarily equal the quantity of bits transferred in either a WRITE or READ operation.

Generally, a data transfer operation in a processing system occurs between a host and a storage element. A host may include a processor (e.g., central processor unit (CPU), microprocessor, microcontroller, multiprocessor, etc.). In one example, the control path (e.g., CA bus) from a host to a storage element (e.g., DRAM) may require an intermediary device (e.g., a Registering Clock Drive (RCD)) for signal conditioning. Signal conditioning may include, for example, buffering, signal registration, re-clocking, re-driving, etc. The RCD may be part of the storage element, for example, a DRAM, or may be one component in a memory module, for example, a dual inline memory module (DIMM).

A memory device (e.g., DRAM) may use a clock signal, for example, a periodic square wave reference signal (e.g., with alternating low and high levels), to regulate synchronous operation of the DRAM. A clock signal may include a plurality of repeating clock cycles. In general, a DRAM may function in a variety of modes, for example, data rate modes. Two used data rate modes are single data rate (SDR) mode and dual data rate (DDR) mode. Data rate modes may be used for the control path (e.g., CA bus). For example, in SDR mode, data are transferred only on either a rising edge (i.e., low/high transition) or a falling edge (i.e., high/low transition) of a clock cycle. That is, a data transfer operation occurs only once per clock cycle. In DDR mode, data are transferred on both the rising edge and falling edge of the clock cycle. That is, data transfer operations occur twice per clock cycle.

DRAM technology has evolved over time to achieve progressively more capable memory devices. For example, DRAM technology has progressed from DDR1 through DDR2, DDR3, DDR4, DDR5, etc. DRAM interface requirements are specified by industry standards bodies, for example, Joint Electron Device Engineering Council (JEDEC), to ensure device compatibility among different vendors.

A form of volatile memory (i.e., storage element) is a Dynamic Random Access Memory (DRAM). A host (e.g., computer, processor, controller, etc.) may employ the DRAM for rapid storage and retrieval of data and instructions. Data may be stored and/or retrieved in the DRAM using an addressing mechanism (e.g., memory control path) to specify a DRAM location for data storage or data retrieval. One type of memory control path is a command/address (CA) bus. In some cases, an intermediary device, known as a Registering Clock Drive (RCD), mediates between the host and DRAM by providing signal conditioning. The RCD has an input CA bus and an output CA bus. One form of mediation is data rate mode mediation. Two used DRAM data rate modes are single data rate (SDR) mode and dual data rate (DDR) mode.

Figure 1:
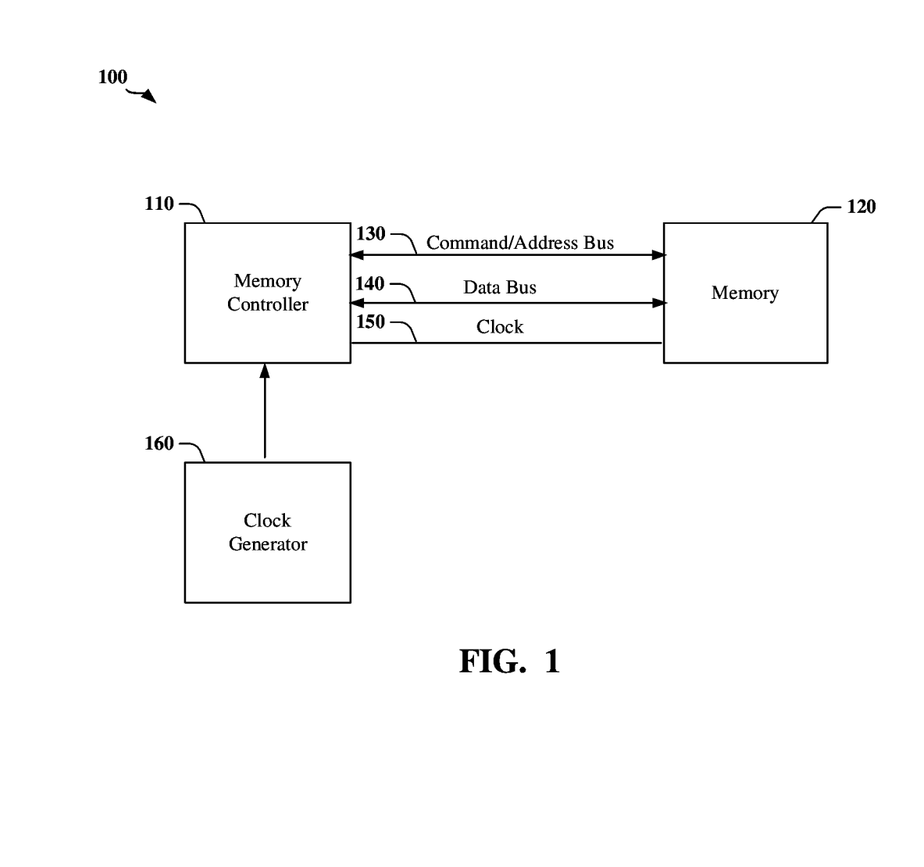
FIG. 1 illustrates an example memory system showing signaling between a memory controller and memory.

FIG. 1 illustrates an example memory system 100 showing signaling between a memory controller and memory. Shown in FIG. 1 are two elements, a memory controller 110 and a memory 120. Also shown in FIG. 1 are three signal paths between the memory controller 110 and the memory 120: a) a command/address (CA) bus 130; b) a data bus 140; and c) a clock signal 150. In one example, the memory controller 110 is part of a host which either sends data on data bus 140 to the memory 120 as part of a WRITE operation or receives data on data bus 140 from the memory 120 as part of READ operation. The command/address (CA) bus 130 may be used to execute the WRITE or READ operations and to specify the desired memory address for either operation. In addition, the clock signal 150 may be used to pace the WRITE and READ operations synchronously. In one example, the clock signal 150 is generated by a clock generator 160 which is coupled to the memory controller 110. In another example, although not shown, the clock generator 160 may be coupled directly to the memory 120. In another example, the clock generator 160 may be couple to either or both of the memory controller 110 and memory 120 through a clock distribution circuit (not shown).

Figure 2:
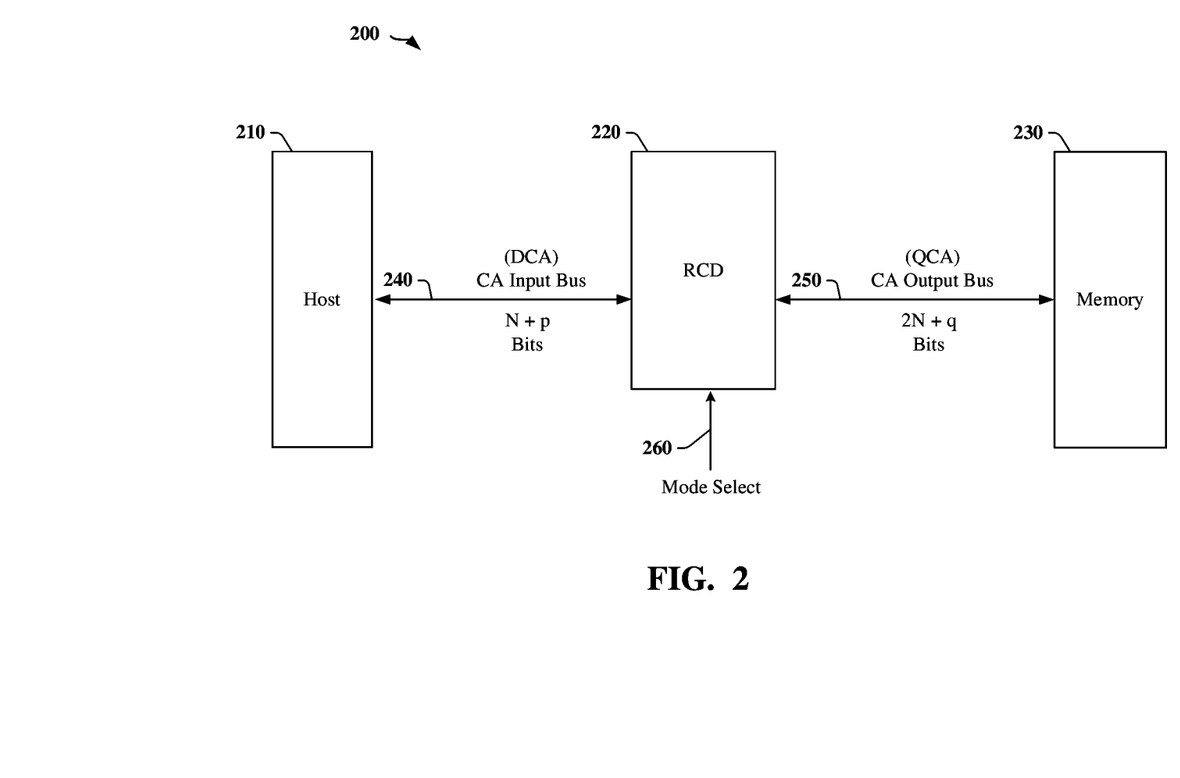
FIG. 2 illustrates an example memory system with a Registering Clock Device (RCD) between a host and a memory.

FIG. 2 illustrates an example memory system 200 with a Registering Clock Device (RCD) 220 between a host 210 and a memory 230. In one example, the memory 230 is Dynamic Random Access Memory (DRAM). Shown in FIG. 2 are a control/address (CA) input bus 240 and a control/address (CA) output bus 250. The host 210 may include a host interface which is an output of the host 210 connected to the CA input bus 240 which is inputted to the RCD 220. The RCD 220 may include an RCD input interface which is an input to the RCD connected to the CA input bus 240 from the host 210. The host interface and the RCD input interface allow interconnection between the host 210 and the RCD 220 using the CA input bus 240. The RCD 220 may include an RCD output interface which is an output to the memory 230 via the CA output bus 250 to the memory 230.

The CA input bus 240 with (N+p) bits delivers command data and address input data from the host 210 to the RCD 220. N denotes the quantity of bits being transferred over the CA input bus and p denotes the quantity of parity bits over the CA input bus. For example, p=0 denotes a no parity case, p=1 denotes a single parity case, p=2 denotes a double parity case, etc. The CA output bus 250 with (2N+q) bits delivers command output data and address output data from the RCD 220 to the memory 230. 2N denotes the quantity of bits being transferred over the CA output bus and p denotes the quantity of parity bits over the CA output bus. The CA output bus may add parity bits (i.e., q≠0) or may not add parity bits (i.e., q=0). Also, a mode select control line 260 is shown as a mode select input to the RCD. In one example, the mode select control line 260 may be used to select a data rate mode for the CA input bus 240. For example, the data rate modes may be Single Data Rate (SDR), Double Data Rate (DDR), Quadruple Data Rate (QDR), etc. In one example, the data rate mode may be set at initialization and may remain static for a session. In another example, the data rate mode may be variable over a session. That is, the data rate mode may vary between the SDR mode and the DDR mode. In one example, a session is a time duration for execution for a group of operational steps. For example, a session may be a time duration between a user login and user logout.

In one example, data rate mode selection may allow optimization of operational scenarios. For example, data rate mode selection may optimize selection of either SDR mode or DDR mode dependent on a variety of operational scenarios. In one aspect, data rate mode selection may be based on clock speed, burst lengths, dc power constraints, data traffic characteristics, access statistics, read/write ratio, latency, duty factor, page clustering, and/or streaming characteristics. For example, the data rate mode may be selected depending on clock speed since DDR mode operation may be restricted by a maximum DDR mode clock speed (e.g., due to limited higher speed scaling in DDR mode). For example, the data rate mode may be selected depending on burst length since a longer burst length provides a higher data transfer rate such that SDR mode may be optimal. For example, the data rate mode may be selected depending on dc power constraints since DDR mode operation may consume more dc power than SDR mode. For example, the data rate mode may be selected depending on access statistics or data traffic characteristics (e.g., random access or clustered (correlated) access). In one example, random access may be more appropriate with DDR mode and clustered access may be more appropriate with SDR mode. In one example, data traffic characteristics may be quantified using an address correlation metric. An address correlation metric quantifies randomness in sequential memory accesses. In one example the address correlation metric is a normalized value ranging from 0 to 1, where 0 denotes totally uncorrelated sequential memory accesses (e.g., random access) and 1 denotes totally correlated sequential memory accesses (e.g., clustered memory access).

In one example, data rate mode selection may allow more relaxed timing constraints, dc power savings, reduced channel characterization training time (e.g., equalizer training), etc. when SDR mode is selected. For example, more relaxed timing constraints may include a more relaxed interface setup and hold time, for example, relaxing from a half clock cycle in DDR mode to a full clock cycle in SDR mode. In one example, this relaxed timing constraint facilitates scaling to a higher clock speed and in achieving tight clock skew requirements. Moreover, in one example, board constraints may not allow usage of DDR mode.

Figure 3:
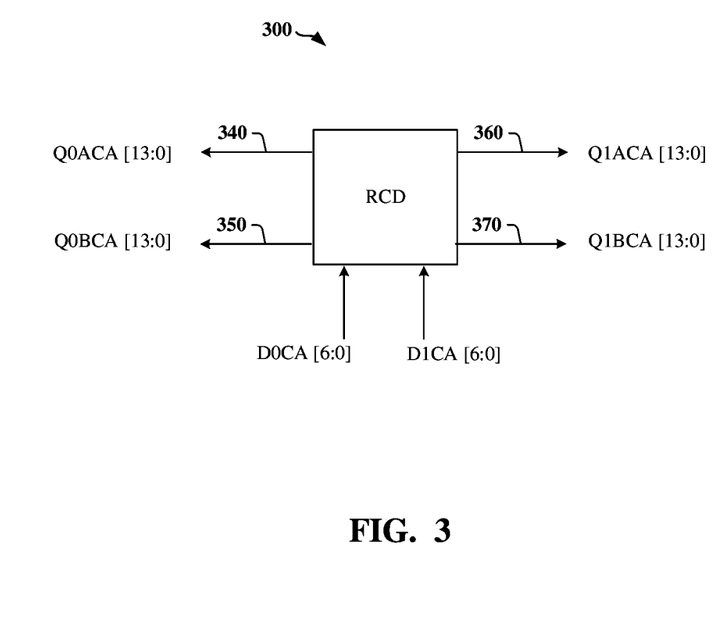
FIG. 3 illustrates an example of a two channel RCD with two input buses and four output buses.

FIG. 3 illustrates an example of a two channel RCD 300 with two CA input buses and four CA output buses. In the example of FIG. 3, two CA input buses are shown (D0CA 320 and D1CA 330), and four CA output buses are shown (Q0ACA 340, Q0BCA 350, Q1ACA 360, and Q1BCA 370). Each channel of the RCD 300 may include one CA input bus and two CA output buses. For example, a first channel may include D0CA 320 for a CA input bus and Q0ACA 340 and Q0BCA 350 for two CA output buses. For example, a second channel may include D1CA 330 for a CA input bus and Q1ACA 360 and Q1BCA 370 for two CA output buses. In one example, the CA input buses each include N bits and the CA output buses each include 2N bits. The CA input buses may also include input parity bits of length p bits; that is, p=0, p=1 or p>1. And, the CA output buses may include output parity bits of length q; that is, q=0, q=1 or q>1. In one example, the CA input bus may operate in either SDR mode or DDR mode, and the CA output bus may operate in SDR mode. For the CA output bus, SDR mode may also be denoted as 2N mode. In 2N mode, data is transferred only on every other clock edge, for example, every other rising edge. In 1N mode, data is transferred on every clock edge, for example, every rising edge.

In one example, the RCD 300 supports two input data rate modes, SDR (single data rate) mode and DDR (double data rate) mode, on the CA input bus (i.e., facing the host) to control the registration of bits on the CA input bus. For example, the input data rate mode may be selected using a mode select control line to the RCD. An example of a mode select control line is illustrated in FIG. 2 as the mode select control line 260. In another example, the input data mode may be selected by programming a mode control bit in the RCD. The mode control bit is programmed, for example, via a command on the CA input bus.

In one example, a default state of the mode select control line is SDR mode. In one example, the default state is a system state that is employed if no explicit command is used to set the system state. The CA input bus has a bit width of N bits. In one example, N=7. As an example, a single input parity bit or multiple input parity bits may be added to the CA input bus, beyond N bits. That is, p=1 or p>1. The CA output bus has a bit width of 2N bits. In one example, 2N=14. As an example, output parity bits may not be added to the CA output bus; that is, q=0. Or, output parity bits may be added to the CA output bus; that is, q=1 or q>1. In an example, the RCD may expand the bit width of the CA input bus from N bits to 2N bits on the CA output bus.

Table 1 illustrates one possible mapping of the CA input bus bits (a.k.a., DCA) to the CA output bus bits (a.k.a., QCA). For example, the CA input bus bits may be individually designated as input bit zero, input bit one, input bit two, etc., where input bit zero may be the least significant bit (LSB) of the CA input bus bits. For example, DCA0 may refer to input bit zero of either D0CA or D1CA, DCA1 may refer to input bit one of either D0CA or D1CA, DCA2 may refer to input bit two of either D0CA or D1CA, etc. For example, the CA output bus bits may be individually designated as output bit zero, output bit one, output bit two, etc., where output bit zero may be the least significant bit (LSB) of the CA output bus bits. For example, QCA0 may refer to output bit zero of either Q0CA or Q1CA, QCA1 may refer to output bit one of either Q0CA or Q1CA, QCA2 may refer to output bit two of either Q0CA or Q1CA, etc.

TABLE 1

| U1 | DCA0 | DCA1 | DCA2 | DCA3 | DCA4 | DCA5 | DCA6 |
|----|------|------|------|------|------|------|------|
| 0  | QCA0 | QCA1 | QCA2 | QCA3 | QCA4 | QCA5 | QCA6 |
| 1  | QCA7 | QCA8 | QCA9 | QCA10| QCA11| QCA12| QCA13|

Also, in one example UI denotes Unit Interval, also known as a symbol duration time. For example, one UI is a minimum time interval between signal state changes (e.g., pulse time or symbol duration time) where one UI is the time taken by each successive pulse or symbol. In one example, Table 1 shows a mapping of input data to output data, where there may be 7 bits of input data (e.g., DCA) and 14 bits of output data (e.g., QCA). For example, the input data (e.g., DCA) may be transferred over two UIs labeled as UI 0 and UI 1. For example, input data from UI 0 may generate a first subset of output data (e.g., QCA 0-QCA 6) and input data from UI 1 may generate a second subset of output data (e.g., QCA 7-QCA 13).

For example, in SDR mode for the CA input bus (i.e., DCA), the mode select control line remains at SDR mode for the host interface and the CA output bus (i.e., QCA) operates in 2N mode when the SDR mode is enabled on the CA input bus (DCA). In this case, an advantage may be that the RCD obtains more setup and hold time on the CA output bus in 2N mode, which improves signal integrity margin.

In one example, there may be an additional half cycle clock delay on the CA output bus in SDR mode since data is captured on a next rising edge of the clock signal instead of a next falling edge of the clock signal. In one example, the performance impact of this delay is minimal since read latency is typically tens of clock cycles. In addition, CA output bus utilization rate may be doubled in SDR mode, but the performance impact is minimal since it typically takes eight clock cycles to transfer data for each command to a DRAM.

Figure 4:
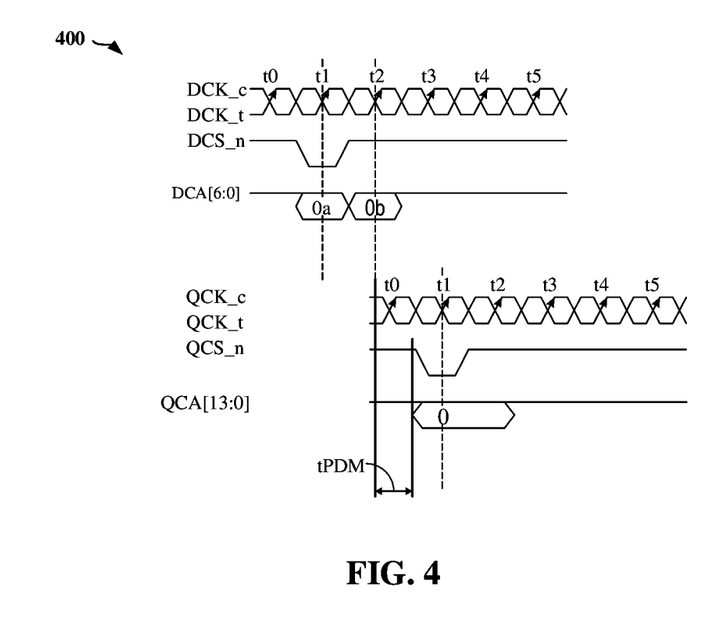
FIG. 4 illustrates an example of a one unit interval (UI) timing diagram in Single Data Rate (SDR) mode.

FIG. 4 illustrates an example of a one unit interval (UI) timing diagram 400 in Single Data Rate (SDR) mode. In the example of FIG. 4, a command or address is transferred over one UI, where one UI represents a symbol duration time. An input clock DCK_t and its complement DCK_c are shown at the top of FIG. 4 with the clock rising edge denoted with an uprising arrow. An input chip select signal DCS_n is used to select a chip for a memory input operation. A command or address is transferred using an input CA bus signal DCA. In one example, DCA has 7 input bits, denoted as DCA[6:0]. Parity for the input CA bus signal may be conveyed using a parity signal DPAR (not shown). An output clock QCK_t and its complement QCK_c are also illustrated. An output chip select signal QCS_n is used to select a chip for a memory output operation. A command or address is transferred using an output CA bus signal QCA. In one example, QCA has 14 output bits, denoted as DCA[13:0]. In one example, QCA transfers data every clock cycle, i.e., once per UI.

Figure 5:
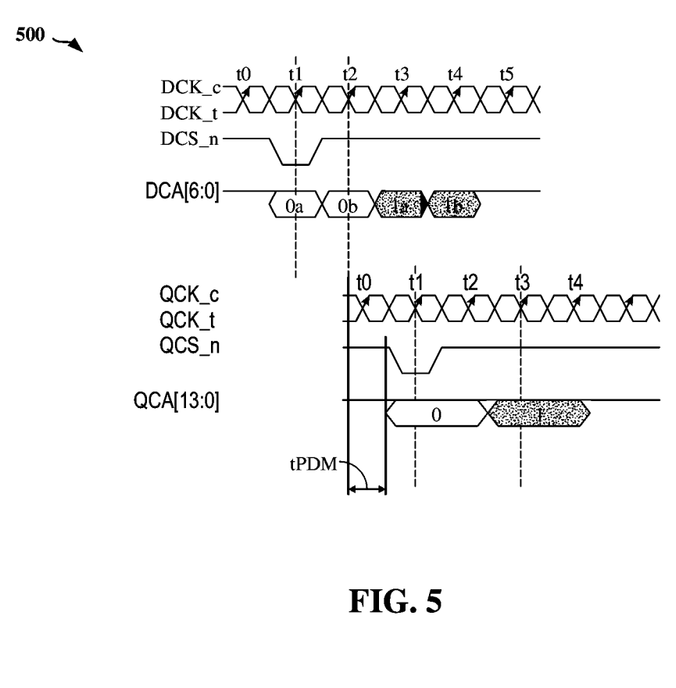
FIG. 5 illustrates an example of a two unit interval (UI) timing diagram in Single Data Rate (SDR) mode.

FIG. 5 illustrates an example of a two unit interval (UI) timing diagram 500 in Single Data Rate (SDR) mode. In the example of FIG. 5, a command or address is transferred over two UIs, where one UI represents a symbol duration time. An input clock DCK_t and its complement DCK_c are shown at the top of FIG. 5 with the clock rising edge denoted with an uprising arrow. An input chip select signal DCS_n is used to select a chip for a memory input operation. A command or address is transferred using an input CA bus signal DCA. In one example, DCA has 7 input bits, denoted as DCA[6:0]. Parity for the input CA bus signal may be conveyed using a parity signal DPAR (not shown). An output clock QCK_t and its complement QCK_c are also illustrated. An output chip select signal QCS_n is used to select a chip for a memory output operation. A command or address is transferred using an output CA bus signal QCA. In one example, QCA has 14 output bits, denoted as DCA[13:0]. In one example, QCA transfers data every other clock cycle, i.e., once per 2 UI.

Table 2 illustrates the characteristics of the propagation delay tPDM through the Registering Clock Drive (RCD).

TABLE 2

| Symbol | Parameters | Conditions | Min | Max | Unit |
| --- | --- | --- | --- | --- | --- |
| tPDM (1, 2) | Propagation delay, single bit switching, CK_t/CK_c falling edge cross point to output | TBD V operation | TBD | TBD | ns |

1. tPDM is defined for 0nCK command latency adder.
2. tPDM for SDR mode is measured from CK_t/CK_c rising edge cross point to output.

Figure 6:
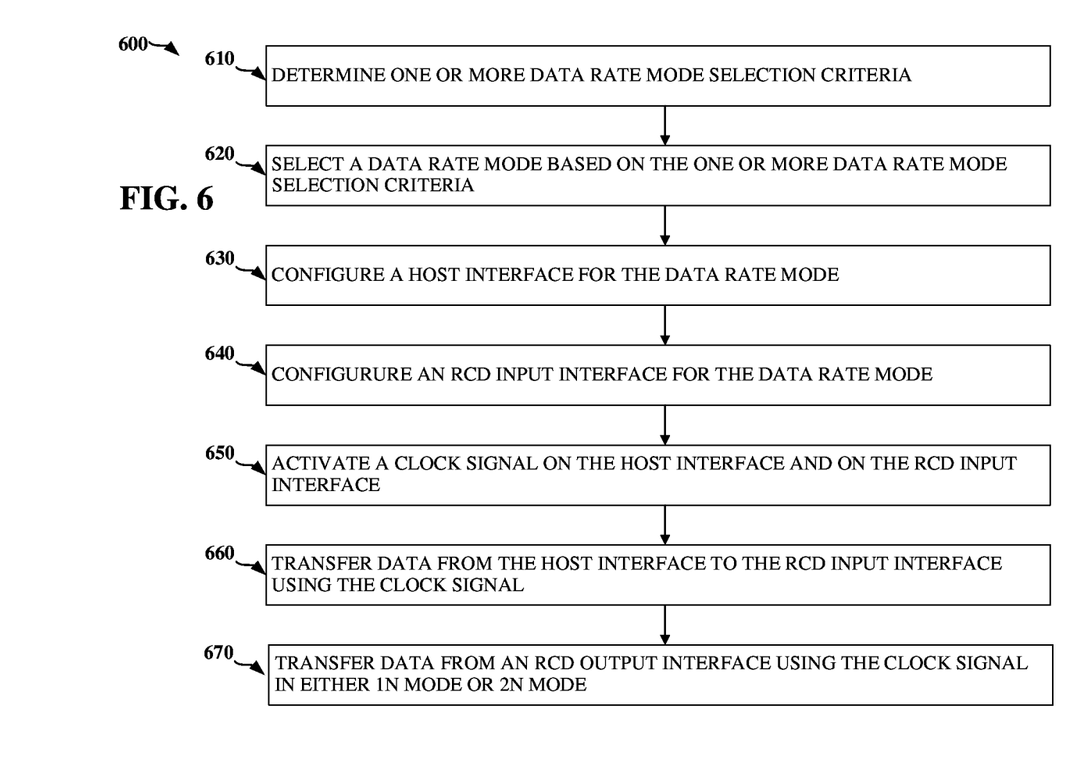
FIG. 6 illustrates an example flow diagram for selecting and executing a data rate mode for a command/address (CA) bus for a Registering Clock Drive (RCD) for a Dynamic Random Access Memory (DRAM).

FIG. 6 illustrates an example flow diagram 600 for selecting and executing a data rate mode for a command/address (CA) bus for a Registering Clock Drive (RCD) for a Dynamic Random Access Memory (DRAM). In block 610, determine one or more data rate mode selection criteria. In one aspect, the data rate mode selection criteria may be based on memory features and/or application needs. Examples of memory features may include clock speed and/or burst lengths. Examples of application needs may include access statistics, read/write ratio, latency, duty factor, page clustering, and/or streaming characteristics. In one example, the data rate mode selection criteria may include dc power constraints and/or data traffic characteristics.

For example, for clock speeds beyond a speed threshold value, DDR mode may not be feasible and a data rate mode selection criterion may be based on the clock speed. In one example, if the clock speed exceeds the speed threshold value, select SDR mode. If the clock speed does not exceed the speed threshold value, select DDR mode. In one example, the speed threshold value may be 4.8 Gigatransfers per sec (Gtps).

For example, the data rate mode selection criterion may be based on a burst length. In one example if the burst length is greater than or equal to a burst length threshold value, select SDR mode. If the burst length is less than a burst length threshold value, select DDR mode. In one example, the burst length threshold value is 16 clock cycles. In another example, the burst length threshold value is 32 clock cycles. In one example, the burst length is a group of symbols (measured in clock cycles) transferred on the CA input bus 240 (shown in FIG. 2).

For example, the data rate mode selection criterion may be based on data traffic characteristics or access statistics, such as an address correlation metric. An address correlation metric quantifies randomness in sequential memory accesses. In one example the address correlation metric is a normalized value ranging from 0 to 1, where 0 denotes totally uncorrelated sequential memory accesses (e.g., random access) and 1 denotes totally correlated sequential memory accesses (e.g., clustered memory access). In one example, define an address correlation metric threshold for the data rate mode selection criterion. For example, if the address correlation metric exceeds the address correlation metric threshold, select SDR mode. Otherwise, select DDR mode. In one example, the step in block 610 is performed by a memory controller (e.g., memory controller 110).

In block 620, select a data rate mode based on the one or more data rate mode selection criteria. In one example, the data rate modes are single data rate (SDR) mode and double data rate (DDR) mode. In another example, the data rate mode is quadruple data rate (QDR) mode. In one example, the step in block 620 is performed by a memory controller (e.g., memory controller 110).

In block 630, configure a host interface for the data rate mode. The host interface is an output of the host, for example, to the RCD via a first bus (e.g., CA input bus 240 shown in FIG. 2). For example, if the SDR mode is the data rate mode, then the host interface is configured for the SDR mode. In another example, if the DDR mode is the data rate mode, then the host interface is configured for the DDR mode. In one aspect, the host interface is a first command/address bus interface. In one aspect, the host interface includes a first data bus and a first clock signal. In one aspect, configuring the host interface may include initiating data transfer on the host interface over the first data bus using the first clock signal. In one example, the step in block 630 is performed by a memory controller (e.g., memory controller 110).

In block 640, configure an RCD input interface for the data rate mode (i.e., the SDR mode or the DDR mode). The RCD input interface is an input to the RCD, for example, from the host via the first bus (e.g., CA input bus 240 shown in FIG. 2). In one example, the RCD input interface is a second command/address bus interface. The first command/address bus interface and the second command/address bus interface may be connected to a CA input bus. In one example, the host interface for SDR mode and the RCD input interface includes N input bits. And, in another example, the host interface for DDR mode and the RCD input interface includes N input bits. In one example, the host interface and the RCD input interface may include a plurality of input parity bits. And, in one aspect, configuring the RCD input interface may include initiating data reception on the RCD input interface using the clock signal. In one example, the step in block 640 is performed by a memory controller (e.g., memory controller 110).

In block 650, activate a clock signal on the host interface and on the RCD input interface. In one example, the clock signal is a square wave signal. In another example, the clock signal is a sine wave signal. In another example, the clock signal is a periodic signal with clock rate R. In one example, SDR mode transfers data on clock signal rising edges. In another example, SDR mode transfers data on clock signal falling edges. In one example, DDR mode transfers data on both clock signal rising edges and clock signal falling edges. In one example, the step in block 650 is performed by a clock generator (e.g., clock generator 160).

In block 660, transfer data from the host interface to the RCD input interface using the clock signal for the data rate mode (i.e., the SDR mode or the DDR mode). In one example, the transferred data is a command. In one example, the transferred data is an address. In one example, the address is used to specify a memory location for data storage or data retrieval. In one example, in block 660, the data is transferred between the host interface and the RCE input interface. In one example, transferring the data includes a WRITE operation. In one example, transferring the data includes a READ operation. In one example, the data includes a command or an address. In one example, a command includes a set of bit patterns which designate a desired operation or state, for example, WRITE, READ, CLEAR, RESET, etc. In one example, an address is a specific group of bit patterns which designates a desired memory location for either a WRITE operation or a READ operation.

In one example, the step in block 660 is performed by a host (e.g., host 210). In one example, the step in block 660 is performed by a host (e.g., host 210) in conjunction with a RCD (e.g., RCD 220). In one example, the step in block 660 is performed using an input bus (e.g., CA input bus 240).

In block 670, transfer data from an RCD output interface to a memory using the clock signal in either 1N mode or 2N mode. In 1N mode, data is transferred on every clock signal edge, for example, every rising edge or every falling edge. The RCD output interface is an output of the RCD to a memory (e.g., memory 230 shown in FIG. 2) via a second bus (e.g., CA output bus 250 shown in FIG. 2). In 2N mode, data is transferred on every other clock signal edge, for example, every other rising edge or every other falling edge. In one example, the transferred data is a command. In one example, the transferred data is an address. In one example, the address is used to specify a memory location for data storage (e.g., WRITE operation) or data retrieval (e.g., READ operation). In one example, the memory is a dynamic random access memory (DRAM). In one example, the step in block 670 is performed by a RCD (e.g., RCD 220). In one example, the step in block 670 is performed by a RCD (e.g., RCD 220) in conjunction with a memory (e.g., memory 230). In one example, the step in block 670 is performed using an output bus (e.g., CA output bus 250).

One skilled in the art would understand that the steps disclosed in the example flow diagram in FIG. 6 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks and/or algorithm steps described in connection with the examples disclosed herein may be implemented as electronic hardware, firmware, computer software, or combinations thereof. To clearly illustrate this interchangeability of hardware, firmware and software, various illustrative components, logical blocks and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for the various steps described in the blocks of FIG. 6, implementation may include hardware and/or software. In some example, a memory controller residing in the host (e.g., host 210 shown in FIG. 2) or external to the host may house the hardware and/or software. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks and/or algorithm steps described herein may also be coded as computer-readable instructions carried on any computer-readable medium known in the art or implemented in any computer program product known in the art. In one aspect, the computer-readable medium includes non-transitory computer-readable medium.

Computer-readable medium may include both computer storage media and communication media including any medium that facilitates transfer of a computer program from one place to another. A storage media may be any available media that can be accessed by a computer. By way of example, and not limitation, such computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

In one aspect, one or more of the steps for providing a single data rate (SDR) mode or a double data rate (DDR) mode for the command and address (CA) bus of a registering clock drive (RCD) for a dynamic random access memory (DRAM) in FIG. 6 may be executed by one or more processors which may include hardware, software, firmware, etc. In one aspect, one or more of the steps in FIG. 6 may be executed by one or more processors which may include hardware, software, firmware, etc. The one or more processors, for example, may be used to execute software or firmware needed to perform the steps in the flow diagram of FIG. 14. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may reside in the processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for a single data rate (SDR) mode or a double data rate (DDR) mode for the command and address (CA) bus of a registering clock drive (RCD) for a dynamic random access memory (DRAM). Those skilled in the art will recognize how best to implement the described functionality presented throughout this disclosure depending on the particular application and the overall design constraints imposed on the overall system.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for providing a single data rate (SDR) mode or a double data rate (DDR) mode to a Registering Clock Drive (RCD) for a memory, comprising:
   determining one or more data rate mode selection criteria;
   selecting a data rate mode for a command/address (CA) bus based on the one or more data rate mode selection criteria, wherein the one or more data rate mode selection criteria include one of an access statistic or a data traffic characteristic quantified using an address correlation metric;
   configuring a host interface for the data rate mode; and
   configuring an RCD input interface of the Registering Clock Drive (RCD) for the data rate mode.

2. The method of claim 1, wherein the data rate mode is one of the SDR mode or the DDR mode.

3. The method of claim 2, wherein the host interface is an output of a host for connection to the Registering Clock Drive (RCD) via an input bus.

4. The method of claim 3, wherein the RCD input interface is an input of the Registering Clock Drive (RCD) for connection to the host via the input bus.

5. The method of claim 1, wherein the data rate mode is set at initialization and remains static throughout a session.

6. The method of claim 1, wherein the data rate mode is variable between the SDR mode and the DDR mode throughout a session.

7. The method of claim 1, further comprising transferring data between the host interface and the RCD input interface using a clock signal.

8. The method of claim 7, wherein the transferring data includes a WRITE operation.

9. The method of claim 7, wherein the transferring data includes a READ operation.

10. The method of claim 7, wherein the data includes a command or an address.

11. The method of claim 7, further comprising transferring the data from an RCD output interface using the clock signal in either 1N mode or 2N mode, wherein the 1N mode transfers the data on every clock edge and wherein the 2N mode transfers the data on every other clock edge.

12. The method of claim 11, wherein the RCD output interface is an output of the RCD to the memory via an output bus.

13. The method of claim 12, wherein the memory is a dynamic random access memory (DRAM).

14. The method of claim 7, further comprising activating the clock signal on the host interface and on the RCD input interface.

15. The method of claim 1, further comprising configuring the host interface to initiate a data transfer on the host interface using a clock signal.

16. The method of claim 15, further comprising configuring the RCD input interface to initiate a data reception on the RCD input interface using the clock signal.

17. The method of claim 1, wherein the one or more data rate mode selection criteria include at least one of a burst length, a read/write ratio, a latency, a page clustering, a streaming characteristic, or a dc power constraint.

18. An apparatus for providing a single data rate (SDR) mode or a double data rate (DDR) mode to a Registering Clock Drive (RCD) for a memory, the apparatus comprising:
   a memory controller, wherein the memory controller determines one or more data rate mode selection criteria, selects a data rate mode for a command/address (CA) bus based on the one or more data rate mode selection criteria, configures a host interface for the data rate mode and configures an RCD input interface for the data rate mode, wherein the one or more data rate mode selection criteria include one of an access statistic or a data traffic characteristic quantified using an address correlation metric;
   a clock generator coupled to the memory controller, wherein the clock generator activates a clock signal on the host interface and on the RCD input interface; and
   a host coupled to the memory controller, wherein the host transfers data between the host interface and the RCD input interface using the clock signal.

19. The apparatus of claim 18, further comprising a Registering Clock Drive (RCD) coupled to the memory controller, wherein the RCD transfers the data from an RCD output interface using the clock signal in either 1N mode or 2N mode, wherein the 1N mode transfers the data on every clock edge and wherein the 2N mode transfers the data on every other clock edge.

20. The apparatus of claim 19, wherein the host comprises the host interface and the Registering Clock Drive (RCD) comprises the RCD input interface and the RCD output interface.

21. The apparatus of claim 18, wherein the data rate mode is one of the SDR mode or the DDR mode.

22. The apparatus of claim 21, wherein the data rate mode is set at initialization and remains static throughout a session.

23. The apparatus of claim 21, wherein the data rate mode is variable between the SDR mode and the DDR mode throughout a session.

24. An apparatus for providing a single data rate (SDR) mode or a double data rate (DDR) mode to a Registering Clock Drive (RCD) for a memory, comprising:
   means for determining one or more data rate mode selection criteria;
   means for selecting a data rate mode for a command/address (CA) bus based on the one or more data rate mode selection criteria, wherein the one or more data rate mode selection criteria include one of an access statistic or a data traffic characteristic quantified using an address correlation metric;
   means for configuring a host interface for the data rate mode; and
   means for configuring an RCD input interface of the Registering Clock Drive (RCD) for the data rate mode.

25. The apparatus of claim 24, further comprising:
   means for activating a clock signal on the host interface and on the RCD input interface; and
   means for transferring data from the host interface to the RCD input interface using the clock signal.

26. The apparatus of claim 25, further comprising means for transferring the data from an RCD output interface using the clock signal in either 1N mode or 2N mode, wherein the 1N mode transfers the data on every clock edge and wherein the 2N mode transfers the data on every other clock edge.

27. The apparatus of claim 24, wherein the data rate mode is one of the SDR mode or the DDR mode.

28. A computer-readable medium storing computer executable code, operable on a device comprising at least one processor and at least one memory coupled to the at least one processor, wherein the at least one processor is configured to provide a single data rate (SDR) mode or a double data rate (DDR) mode to a Registering Clock Drive (RCD) for a memory, the computer executable code comprising:
   instructions for causing a computer to determine one or more data rate mode selection criteria;
   instructions for causing the computer to select a data rate mode for a command/address (CA) bus based on the one or more data rate mode selection criteria wherein the one or more data rate mode selection criteria include one of an access statistic or a data traffic characteristic quantified using an address correlation metric;
   instructions for causing the computer to configure a host interface for the data rate mode; and
   instructions for causing the computer to configure an RCD input interface of the Registering Clock Drive (RCD) for the data rate mode.

29. The computer-readable medium of claim 28, further comprising:
   instructions for causing the computer to activate a clock signal on the host interface and on the RCD input interface; and
   instructions for causing the computer to transfer data from the host interface to the RCD input interface using the clock signal, and wherein the data rate mode is one of the SDR mode or the DDR mode.

30. The computer-readable medium of claim 29, further comprising:
   instructions for causing the computer to transfer the data from an RCD output interface using the clock signal in either 1N mode or 2N mode, wherein the 1N mode transfers the data on every clock edge and wherein the 2N mode transfers the data on every other clock edge.

* * * * *